United States Patent

Sadler

[11] 3,713,471
[45] Jan. 30, 1973

[54] KNIFE BRACKET FOR FORAGE HARVESTER CUTTERHEAD

[75] Inventor: Loren G. Sadler, Stevens, Pa.

[73] Assignee: Sperry Rand Corporation, New Holland, Pa.

[22] Filed: Aug. 26, 1970

[21] Appl. No.: 66,931

[52] U.S. Cl. .............................83/523, 83/859
[51] Int. Cl. .............................A01d 55/18
[58] Field of Search.......146/107 T, 107 R, 117, 118, 146/119, 120, 121 R, 121 A

[56] References Cited

UNITED STATES PATENTS

| 2,735,469 | 2/1956 | Wast | 146/117 R |
| 2,857,946 | 10/1958 | Nikkel | 146/118 X |
| 3,386,483 | 6/1968 | Waldrop et al. | 146/117 R |

*Primary Examiner*—Willie G. Abercrombie
*Attorney*—Joseph A. Brown, John C. Thompson and James J. Kennedy

[57] ABSTRACT

Single piece U-shaped brackets are mounted between the side plates of a forage harvester rotary cutterhead in circumferentially and evenly spaced relation to individually support the knives at axial and clearance angles for chopping cut crops in a cooperating scissor action with the stationary shear bar.

2 Claims, 3 Drawing Figures

PATENTED JAN 30 1973 3,713,471

INVENTOR
LOREN G SADLER
BY George C. Bower
ATTORNEY

KNIFE BRACKET FOR FORAGE HARVESTER CUTTERHEAD

BACKGROUND OF INVENTION

This invention relates to the cutterheads of forage harvesters, and more particularly to the brackets supporting the cutting knives.

In forage harvesters, the cutterhead usually has a rotatably mounted shaft with two axially spaced side plates and circumferentially spaced knife brackets for supporting the knives in cutting relation with the stationary shear bar. In some of the harvesters the blades are at an axial angle to the shear bar to progressively cut the crops in a scissor-like action fed between the knives and the shear bar. The ideal configuration for the cutting knives is in a spiral to distribute the cutting load over a long arc of the cutterhead and thereby reduce the noise and load of the severing action between the knives and shear bar. The spiral configuration of the knives is an expensive construction. The knives are expensive and the mounting of the knives on the cutterhead is complicated and costly. In many of the forage harvesters, the knife is straight and tilted axially to obtain some of the effect of a spiral configuration at a reduced cost. However, the mounting of the straight knives on the cutterhead is also complicated and costly in order to attain the desired strength and the desired angularity in relation to the shear bar.

It is, therefore, the purpose of this invention to provide a less costly cutterhead on which the cutting knives are strongly mounted at an axial angle for a scissor type of cutting action with the shear bar.

OBJECTS AND SUMMARY OF INVENTION

An object of this invention is to provide an inexpensive bracket for supporting the cutting knife on a forage harvester cutterhead.

Another object of the invention is to provide a knife bracket that inexpensively supports a cutting knife at an axial angle and is of a strong construction.

Another object of the invention is to manufacture the knife bracket for the cutterheads of a forage harvester from standard, readily available and inexpensive material.

In summary, the knife bracket of this invention comprises an intermediate bar and inwardly extending side members at opposite ends of the bar and slightly skewed to the perpendicular to the longitudinal axis of the bar in order to mount the bar and supported knife at an axial angle to the shear bar.

Other and further objects and advantages of this invention will be apparent from the following specifications and appended claims taken in connection with the drawings which illustrate a preferred embodiment of the invention.

DETAILED DESCRIPTION OF THE PREFERRED EMBODIMENT

Figure 1:
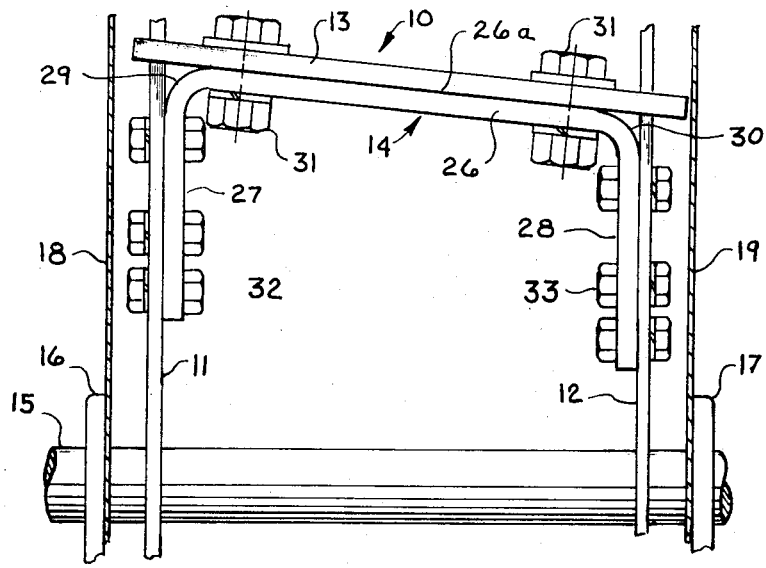
FIG. 1 is a fragmentary front view of the cutterhead.
Figure 2:
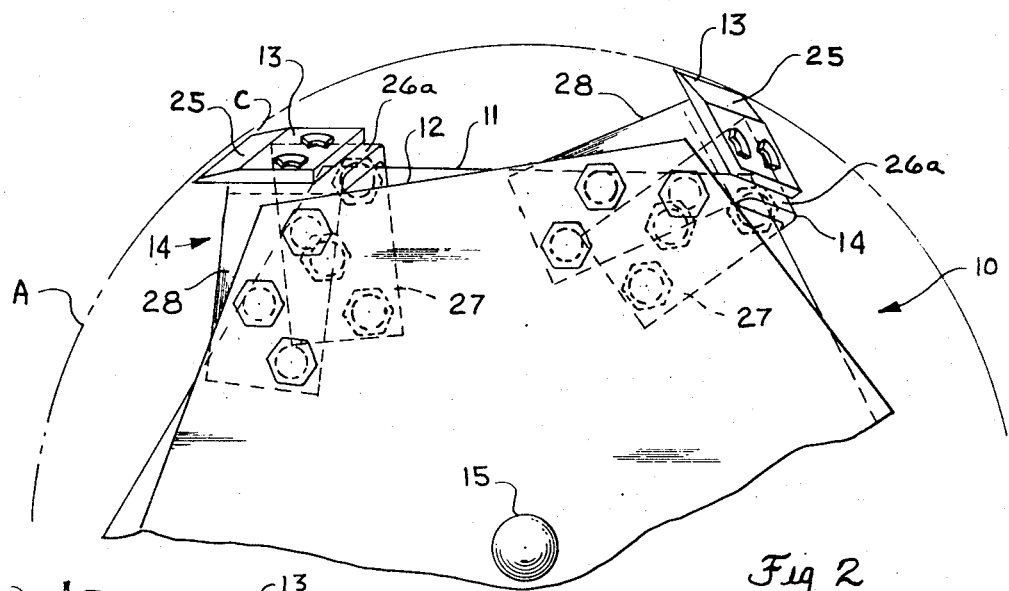
FIG. 2 is a fragmentary side view of the cutterhead.
Figure 3:
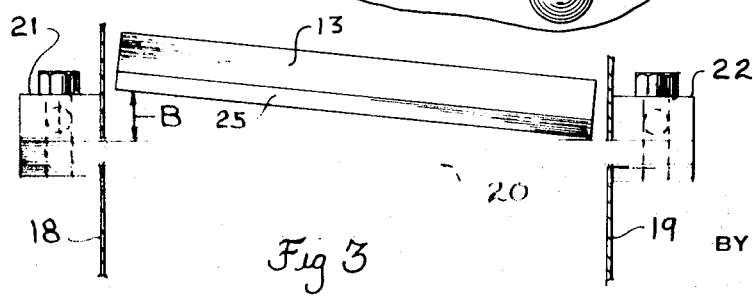
FIG. 3 is a fragmentary view illustrating the angular relationship of the cutting knife and shear bar.

The cutterhead 10 has side plates 11 and 12 affixed to the shaft 15 in axial spaced relation. The shaft 15 is rotatably mounted in bearings 16 and 17 mounted on the outer casing side sheets 18 and 19, respectively. Six knives 13 are respectively mounted on six U-shaped brackets 14 which are evenly spaced around the peripheries of the side plate. The brackets are fastened to the side plates to position the knives in axial angular cutting relation with the shear bar 20. The shear bar is adjustably supported in the mountings 21 and 22 on the outer sides of the side sheets 18 and 19.

The knives are flat and rectangularly shaped and have a beveled cutting edge 25. The edges 25, if not ground, subscribe a hyperboloid-shaped cylinder A which sweeps past the shear bar 20.

The brackets have a U-shape and are formed from a bar having a rectangular cross section. The intermediate portion of the bar is straight and has a flat upper surface 26a. At the ends of the bar are side members 27 and 28 which are connected to the intermediate portion 26 by the curved edges 29 and 30. The side members 27 and 28 are parallel and slightly askew to the intermediate portion. The curved parts 29 and 30 are bent along lines at a slight angle to the perpendicular to the longitudinal length of the intermediate portion 26. The angles of the side members to the intermediate portion are oriented to project the side member 28 forwardly and the side member 27 rearwardly so as to position the left end of the intermediate portion forward of the right end of the intermediate portion in the direction of rotation. Thus, as can be seen from FIG. 1, the angle between the side member 27 and the intermediate portion is slightly less than 90° while the angle between the side member 28 and the intermediate portion 26 is a complimentary angle slightly greater than 90°. The side members 27 and 28 are parallel to each other and are mounted on the side plates 11 and 12. Since the left side members 28 are forward of the right side members 27 the left hexagonal side plate is correspondingly rotated forward of the right hexagonal plate 18. The position of the brackets and particularly the top surfaces 26a on which the knives 13 are mounted, is determined by the axial angle B and the clearance angle C of the cutting edge of the blade 25. Thus the intermediate portion 26 is at an axial angle corresponding to angle B and at an angle to the subscribed cylinder corresponding to the clearance angle C.

The blades 13 are mounted on the intermediate portion 26 by a fastening means 31 including bolts and cooperating nuts. The brackets 14 are mounted by the fastening means 32 and 33 securing the side members 27, 28 to plates 11, 12 respectively. Thus the intermediate portions are securely fastened to the side plates 11 and 12 and supported at both ends to distribute the cutting load to both side plates. The upper surface 26a is generally in line with the cutting load for a direct transmission of the cutting load to the bolts of the fastening means 31 and the intermediate portion.

The brackets 14 are formed from a single piece of bar steel having the side members bent along parallel slightly askew curved edges to impart an axial slope to the intermediate portion 26 for supporting the blade 13 at the desired axial and clearance angles. The bracket properly orientates the blade 13 to the shear bar for a scissor type of cutting action and properly bears the heavy cutting loads applied to the knives in chopping the fed crops. Other than the holes for the fastenings 31, 32 and 33 the brackets do not require any further machining treatment. The bracket is an inexpensive support less costly than the previous brackets provided on forage harvesters. Thus a new and inexpensive bracket has been invented which supports the knife in accordance with desired type of cutting and load transmitting action.

While this invention has been described in connection with a single embodiment, it will be understood that the embodiment is capable of modification and that this application is intended to cover any variations, uses, or adaptations following, in general, the principles of the invention and including such departures from the present disclosures that come within known or customary practice in the art to which the invention pertains, and as fall within the scope of the invention or the limits of the appended claims.

Having thus described my invention, what I claim is:

1. A knife mounting bracket for a forage harvester of the type having a rotatable cutterhead which carries knives at a slight angle to the axis of rotation of the cutterhead to shear off material as it is being introduced into the periphery of the cutterhead over a shear bar in scissors-like fashion, said cutterhead including spaced apart side plates to which the knives are interconnected by a plurality of knife mounting brackets; each knife mounting bracket comprising:
a generally U-shaped member formed from the single piece of bar stock of generally rectangular cross section and including
an intermediate portion having generally parallel leading and trailing edges and upper and lower parallel surfaces, and
side members parallel to each other and jointed to the intermediate portion by curved parts bent along lines at a slight angle to the perpendicular of the edges whereby the side members are disposed in slightly skewed relationship causing one end of the leading edge of the intermediate portion to be ahead of the other end of the leading edge of the intermediate portion when the knife bracket is mounted within the cutterhead.

2. A knife mounting bracket as set forth in claim 1 in which the surfaces of one side member are disposed at an angle slightly greater than 90° to the surfaces of the intermediate member, and the surfaces of the other side member are disposed at an angle slightly less than 90° to the surfaces of the intermediate member.

* * * * *